United States Patent
Chen

(10) Patent No.: US 7,440,833 B2
(45) Date of Patent: Oct. 21, 2008

(54) CLUTCH FILL VOLUME LEARNING STRATEGY FOR TRANSMISSION CONTROL

(75) Inventor: Gang Chen, Rochester Hills, MI (US)

(73) Assignee: Chrysler LLC, Auburn Hills, MI (US)

( * ) Notice: Subject to any disclaimer, the term of this patent is extended or adjusted under 35 U.S.C. 154(b) by 467 days.

(21) Appl. No.: 11/338,230

(22) Filed: Jan. 24, 2006

(65) Prior Publication Data

US 2007/0174000 A1     Jul. 26, 2007

(51) Int. Cl.
*G06F 17/00* (2006.01)
(52) U.S. Cl. .............................. 701/51; 477/70; 701/59
(58) Field of Classification Search ....................... None
See application file for complete search history.

(56) References Cited

U.S. PATENT DOCUMENTS

| | | | | |
|---|---|---|---|---|
| 4,969,098 | A | | 11/1990 | Leising et al. |
| 4,982,620 | A | * | 1/1991 | Holbrook et al. ........... 74/731.1 |
| 5,456,647 | A | * | 10/1995 | Holbrook .................... 477/154 |
| 5,580,332 | A | * | 12/1996 | Mitchell et al. ............. 477/143 |
| 6,039,674 | A | * | 3/2000 | Dourra et al. ................ 477/166 |
| 6,159,129 | A | * | 12/2000 | Holbrook et al. ............ 477/155 |
| 6,978,201 | B1 | | 12/2005 | Chen et al. |
| 7,292,922 | B2 | | 11/2007 | Chen et al. |

\* cited by examiner

*Primary Examiner*—Michael J. Zanelli
(74) *Attorney, Agent, or Firm*—Ralph E. Smith

(57) ABSTRACT

A transmission control system for a transmission including a first gear engagement element that receives a fluid and engages a first gear. The system includes an electromagnetic actuator that receives a control signal and that selectively interrupts flow of the fluid to the first gear engagement element based on a value of the control signal. The system also includes a control module that generates the control signal and that adjusts the value of the control signal so that the first gear engagement element produces a first torque sufficient to hold the first gear. The control module detects a target volume of the fluid when the first gear engagement element produces the first torque. Also, the control module extrapolates a current fill volume (i.e., the volume at which the first gear engagement element begins to produce torque during a shift) of the first gear engagement element from the target volume.

20 Claims, 8 Drawing Sheets

CLUTCH FILL VOLUME LEARNING STRATEGY FOR TRANSMISSION CONTROL

FIELD

The present invention relates to transmission control systems, and more particularly to a clutch fill volume learning strategy for transmission control systems.

BACKGROUND

Due to relatively high instances of system inertia and delay in automotive transmissions, exclusively using feedback control of various components in automotive transmissions may not be sufficient for certain transient schemes. In such transient cases, feedforward control may be used to anticipate system changes. For example, mixed feedforward and feedback control can be used for a smooth upshift in an automatic transmission without causing significant "feel" issues for the driver, thereby improving overall shift quality.

An upshift operation in an automatic transmission typically involves a first clutch (or releasing element) that disengages from a first gear while a second clutch (or applying element) engages a second gear. A third clutch remains engaged during the upshift operation. Therefore, at least two clutches are typically engaged during each gear level of an automatic transmission. For example, an upshift in a 4-speed automatic transmission may be a 1-2 shift, a 2-3 shift, and/or a 3-4 shift.

Referring now to FIG. 1, clutches in automatic transmissions are typically actuated by pressure from fluid such as oil. Oil fills the clutch cavity including a piston and displaces the piston to engage the clutch. Automatic transmission systems also typically include accumulators 10 for each clutch. As oil fills the cavity including the clutch it also fills the accumulator 10. The accumulator 10 includes a spring 12 that is compressed when a piston 14 in the accumulator 10 is displaced by pressure from the oil. The oil begins to displace the piston 14 after all of the empty space in the accumulator 10 is filled with oil and the pressure of the oil increases. Therefore, accumulators 10 reduce the sensitivity of torque variations during the torque phase of an upshift.

A solenoid controls the flow rate of oil to the accumulator 10 and the associated clutch. The duty cycle of a control signal applied to the solenoid determines the fraction of time during which the solenoid valve is open or closed. Thus, the solenoid controls the flow rate and ultimately the pressure of the oil. Also, the accumulator 10 makes the pressure response slower and more difficult to predict. The calculated volume of oil present in the accumulator 10 at a given time is an indicator of the capacity of the clutch at that time. Therefore, the calculated volume can be used for control purposes.

However, the calculated volume may vary throughout the life of the transmission due to wear of the clutch and/or other factors. Transmission control systems have been developed that adjust the duty cycle of the solenoid over the operating life of the transmission to thereby account for changes in the system and to maintain smooth shifting. For instance, applicant's patent application, entitled "TARGET VOLUME BASED TORQUE PHASE CONTROL DURING UPSHIFT", Ser. No. 11/222,066, filed Sep. 8, 2005, discloses such a system. Applicant's patent, entitled "MODEL BASED KICKDOWN SHIFT METHOD FOR CLUTCH TO CLUTCH SHIFT TRANSMISSIONS WITH ACCUMULATORS", U.S. Pat. No. 6,978,201, which issued Dec. 20, 2005, also discloses such a system.

The fill volume (i.e., the volume of oil at which an applying element begins to produce torque during a shift) of each clutch is used by the control logic of these systems to effectuate gear shifts. However, the fill volumes can vary over the lifetime of the vehicle due to wear and/or other factors. As a result, gear shifting may be detrimentally affected due to inaccurate fill volume values stored in memory in the system. Accordingly, there remains a need for a means of accurately measuring updating stored values of the fill volume of a transmission.

SUMMARY

A first object of the present invention provides a transmission control system for a transmission including a first gear engagement element that receives a fluid and engages a first gear in response to pressure from the fluid. The system includes an electromagnetic actuator that receives a control signal and that selectively interrupts flow of the fluid to the first gear engagement element based on a value of the control signal. The system also includes a control module that generates the control signal and that adjusts the value of the control signal so that the first gear engagement element produces a first torque sufficient to hold the first gear. The control module detects a target volume of the fluid when the first gear engagement element produces the first torque. Also, the control module extrapolates a current fill volume (i.e., the volume at which the first gear engagement element begins to produce torque during a shift) of the first gear engagement element from the target volume.

In another aspect, the present invention provides a transmission control system for a transmission including first and second gear engagement elements that receive fluid and engage first and second gears, respectively, in response to pressure from the fluid. The transmission control system includes an electromagnetic actuator that receives a control signal and that selectively interrupts flow of the fluid to the first gear engagement element based on a value of the control signal. The system also includes a control module that generates the control signal and that adjusts the value of the control signal so that the first gear engagement element produces a first torque sufficient to hold the first gear during an upshift. The control module detects a target volume of the fluid when the first gear engagement element produces the first torque. Also, the control module extrapolates a current fill volume of the first gear engagement element from the target volume. In addition, the control module detects a current fill volume of the second gear engagement element by detecting a current volume of the fluid received by the second gear engagement element when the second gear engagement element begins to produce torque during a downshift. The control module only extrapolates the current fill volume of the first gear engagement when either the position of the throttle blade is less than a predetermined value or the transmission input torque is less than a predetermined value.

In still another aspect, the present invention provides a method for operating a transmission control system for a transmission including a first gear engagement element that receives fluid and engages a first gear in response to pressure from the fluid. The method includes the step of selectively interrupting flow of the fluid to the first gear engagement element based on a value of a control signal. The method also includes the step of adjusting the value of the control signal so that the first gear engagement element produces a first torque sufficient to hold the first gear. The method further includes the step of detecting a target volume of the fluid when the first gear engagement element produces the first torque. In addition, the method includes the step of extrapolating a current fill volume of the first gear engagement element from the target volume.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the scope of the disclosure, its application, or uses.

Upshift operations are commonly divided into a torque phase and an inertia phase. During the torque phase of an upshift, a change in turbine speed typically does not occur. The torque of the releasing element decreases to zero from an initial capacity, and the torque of an applying element picks up the entire load. Since the applying element provides less leverage, the output torque decreases when the applying element picks up the entire load. A mismatch in capacity between the releasing and applying elements can result in unstable operation. For example, if the releasing element disengages too soon, turbine speed flare and bump-along may occur. When bump-along occurs an applying clutch that applies too slowly may disengage and attempt to reengage until turbine speed flare is suppressed, which can cause vehicle shudder. When turbine speed flare occurs, a power flow disruption exists between the input and output of the transmission, the engine speed quickly rises, and output torque drops.

Additionally, if the applying element applies too soon, three clutches may be engaged at the same time, acting as a brake. Therefore, the torque phase is a critical part of the upshift, and precision control of automatic transmission components is essential for desirable shift quality. For example, transmission control systems determine when to shift and control the timing of applying and releasing clutches in order to ensure smooth shift transitions.

Target volume torque phase control according to the present invention is proposed to accurately control the duty cycles of solenoids so that the transition from torque phase to inertia phase is smooth, bump free, and completed within a predetermined time period. The present invention uses a model-based approach to identify speed and torque dynamics for each transmission element during transmission shift operations. Target volumes of accumulators required for an associated clutch to produce torque necessary to hold gear are computed and updated as necessary.

Since the dynamics of the transmission change with different speed and acceleration, the target volumes are stored and updated with respect to a current position of the throttle blade when the inertia phase begins. The control module computes continuously variable duty cycles for the solenoids that are utilized during the torque phase based on the stored target volumes so that upshift operations remain stable as conditions of the transmission change over time.

Figure 1:
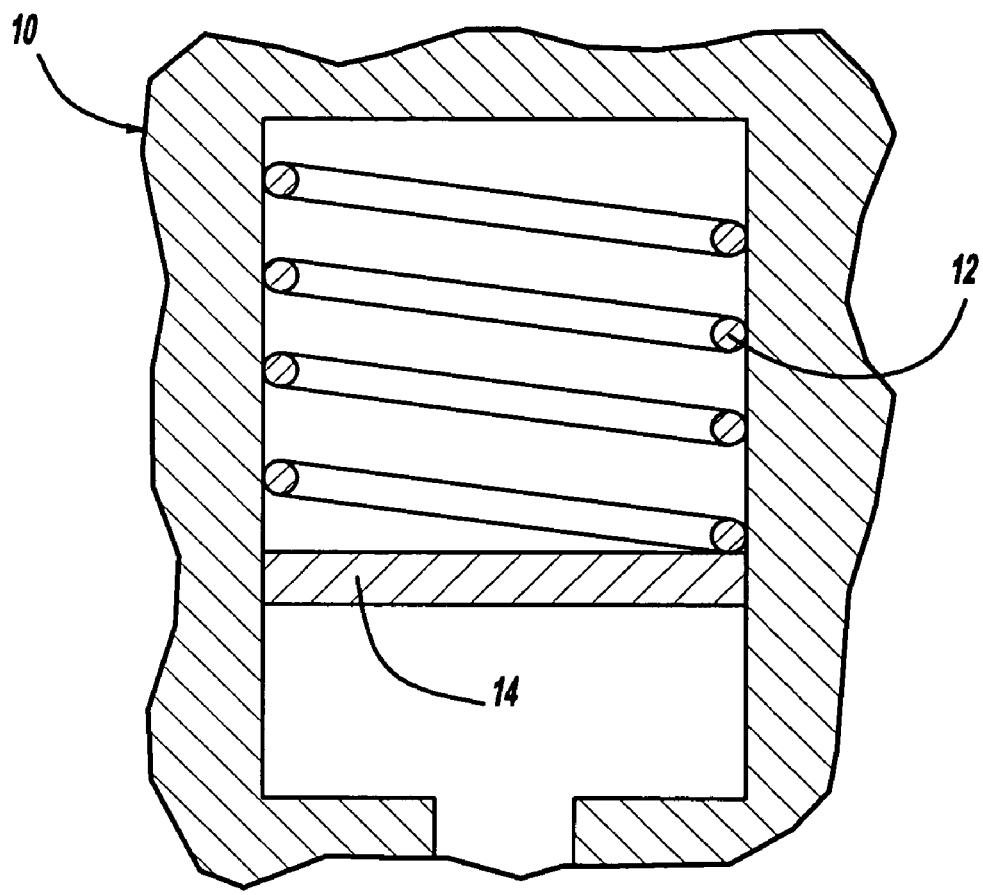
FIG. 1 illustrates an exemplary accumulator for an automatic transmission according to the prior art.
Figure 2:
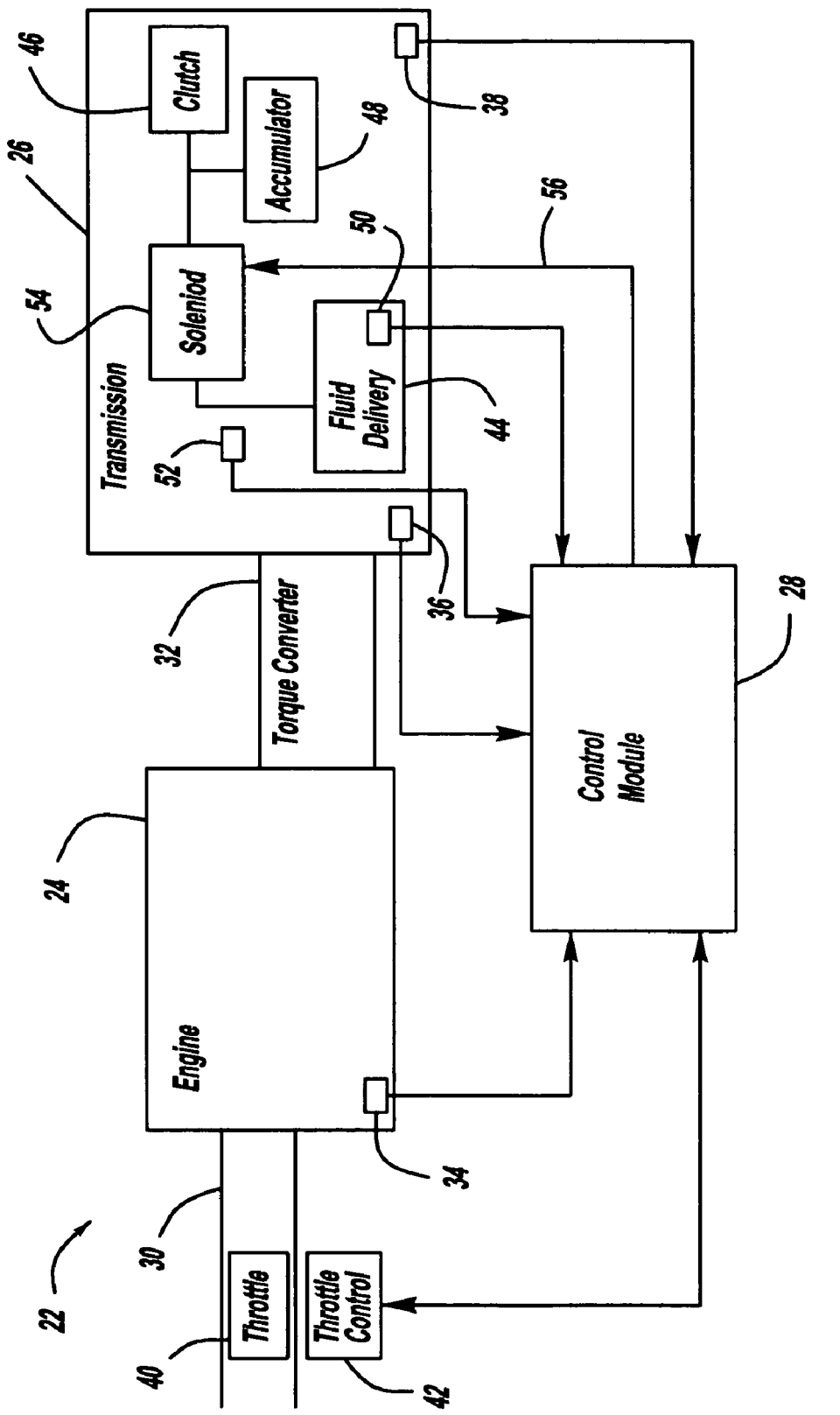
FIG. 2 is a functional block diagram of an automatic transmission control system for a vehicle including a control module that communicates with vehicle sensors according to an exemplary embodiment of the present invention.

Referring now to FIG. 2, an automatic transmission control system 22 includes an engine 24, an automatic transmission 26, and a control module 28. The engine 24 receives air through an inlet 30, and the air mixes with fuel in cylinders of the engine 24. The air/fuel mixture is ignited in the cylinders to generate rotational power on an engine shaft. The engine 24 drives the transmission 26 through a torque converter 32, and the transmission 26 drives a vehicle through a gear ratio. The control module 28 communicates with various sensors and controls gear shifting in the transmission 26. For example, an engine speed sensor 34 in the engine 24 generates an engine speed signal and transmits the engine speed signal to the control module 28. A turbine speed sensor 36 in the transmission 26 generates a turbine speed signal and transmits the turbine speed signal to the control module 28.

An output speed sensor 38 in the transmission 26 generates an output speed signal and transmits the output speed signal to the control module 28. A throttle blade 40 in the inlet controls a flow rate of air to the engine 24. A position of the throttle blade 40 typically relates to a desired speed and/or acceleration of the vehicle by the driver. The control module 28 communicates with a throttle control module 42 in order to detect and/or adjust a position of the throttle blade 40. For example, the throttle control module 42 may include a throttle position sensor and/or an electronic throttle controller.

A fluid delivery system 44 in the transmission 26 delivers oil to a clutch 46 and an accumulator 48 during shift maneuvers. For example, the fluid delivery system 44 may include a sump with oil, a pump, and/or other hydraulic system components. A fluid temperature sensor 50 in the fluid delivery system 44 generates a fluid temperature signal and transmits the fluid temperature signal to the control module 28. A line pressure sensor 52 in the transmission 26 generates a line pressure signal and transmits the line pressure signal to the control module 28. An electromagnetic actuator, such as a solenoid 54, is located between the fluid delivery system 44 and the clutch 46 and accumulator 48.

The solenoid 54 selectively interrupts the flow of oil to the clutch 46 and accumulator 48 in response to the duty cycle of an applied control signal 56. Therefore, the solenoid 54 controls the flow rate and pressure of the oil delivered to the clutch 46 and accumulator 48. The control module 28 generates the control signal 56 and transmits the control signal 56 to the solenoid 54. While a single clutch 46 is illustrated in FIG. 2, those skilled in the art can appreciate that the transmission 26 includes multiple clutches 46 that are selectively engaged and disengaged in order to shift between gears.

As the accumulator 48 fills with oil, the volume of the accumulator 48 varies, which changes the clutch pressure based on the accumulator spring rate. The control module 28 determines the torque required by the transmission element clutches 46 to keep the transmission 26 in gear. In an exemplary embodiment, the control module 28 determines the required torque based on engine speed, accumulator volume, input torque from the turbine, inertia of the engaged elements 46 in the transmission 26, and output acceleration of the transmission 26. The control module 28 also computes a continuously variable duty cycle of the control signal 56 for the solenoid 54. In an exemplary embodiment, the control module 28 computes the duty cycle based on the relationship between the torque and pressure of the individual element clutches 46 as well as the relationship between accumulator pressure and accumulator volume change.

Figure 3:
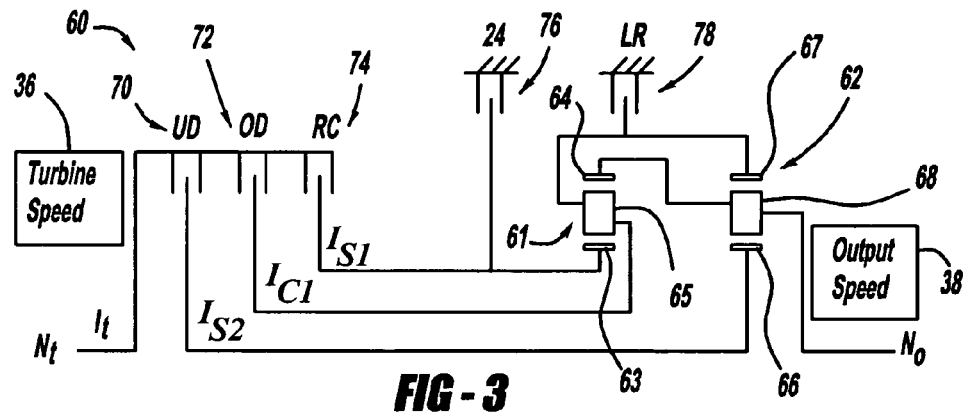
FIG. 3 illustrates an automatic transmission system including clutches that are engaged and disengaged during gear shifts according to an exemplary embodiment of the present invention.

Referring now to FIG. 3, upshift operations are controlled based on target volume control and continuously variable solenoid duty cycles. An exemplary automatic transmission 60 includes planetary elements 61 and 62 and element clutches 70, 72, 74, 76, and 78. Planetary element 61 includes sun gear 63, ring gear 64, and carrier 65, and planetary element 62 includes sun gear 66, ring gear 67, and carrier 68. One or more of the clutches 70, 72, 74, 76, and/or 78 interact with one or more of the planetary elements 61 and/or 62 in order to select a gear ratio of the transmission 60. For example, when clutch 70 is in contact with sun gear 66 and clutch 78 is in contact with carrier 65 and ring gear 67, $1^{st}$ gear is selected. However, in order to select $2^{nd}$ gear, clutch 70 must be in contact with sun gear 66 and clutch 76 must be in contact with sun gear 63. Therefore, in order for the transmission 60 to upshift from $1^{st}$ gear to $2^{nd}$ gear, clutch 78 must release carrier 65 and ring gear 67 and clutch 76 must be applied to sun gear 63.

In any particular upshift, the element clutches 70, 76, and 78 that are releasing are referred to as releasing element clutches, and element clutches 72 and 76 that are applied during an upshift are referred to as applying element clutches. Hereinafter, all references to the releasing element refer to clutch 78 and all references to the applying element refer to clutch 76 with respect to a 1-2 upshift. Although the following strategy and associated equations refer to a 1-2 upshift, it should be understood that analogous calculations can be applied to other upshifts such as 2-3 and/or 3-4 upshifts.

Figure 4:
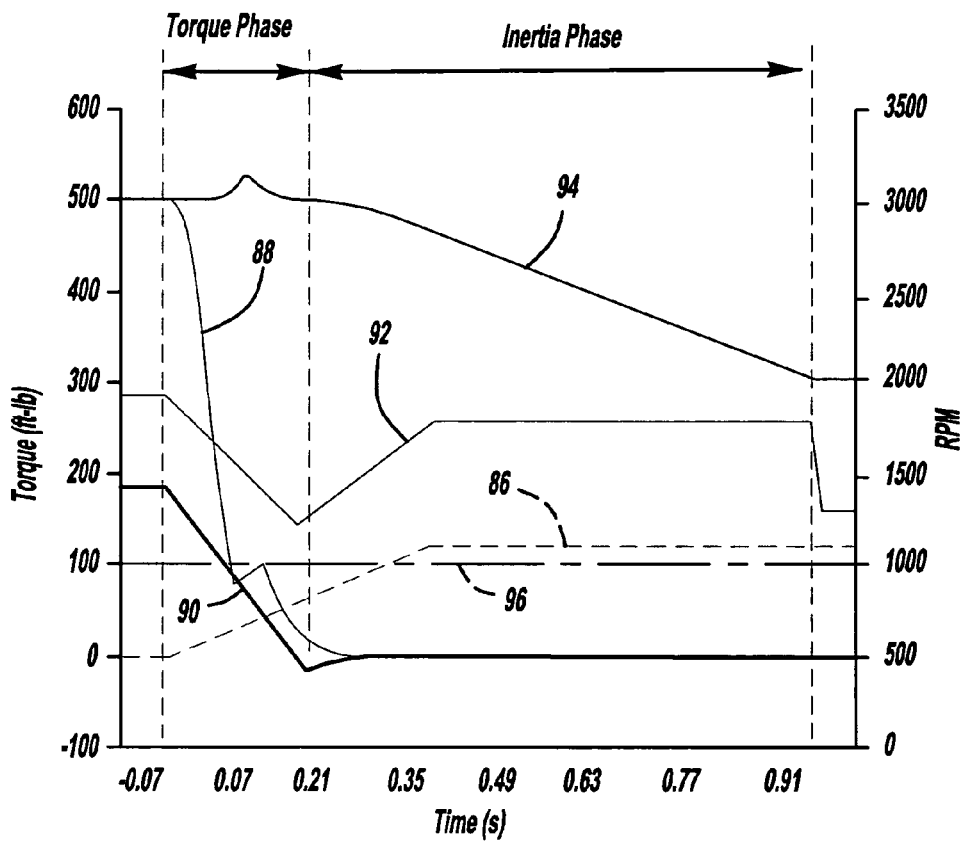
FIG. 4 is a graph illustrating turbine speed and torques exhibited at a plurality of components in an automatic transmission as a function of time and during an upshift operation according to an exemplary embodiment of the present invention.

Referring now to FIG. 4, the torque phase begins when the torque (identified by 86) of the applying element 76 begins to increase. At the beginning of an upshift, the applying element 76 begins to fill with oil, which increases the torque 86 of the applying element 76. The releasing element 78 is vented, which makes the capacity of the releasing element 78 (identified by 88) quickly fall. As the torque of the applying element 76 increases, the torque of the releasing element 78 (identified by 90) begins to decrease from a value necessary to hold the transmission 60 in $1^{st}$ gear.

Ideally, both the capacity 88 and torque 90 of the releasing element 78 decrease to zero by the end of the torque phase. However, as shown in FIG. 4, the capacity 88 of the releasing element 78 may decrease below the torque 90 of the releasing element 78. In this case bump-along occurs, which causes the turbine speed 94 to increase and the releasing element 78 is temporarily reapplied until the turbine speed 94 returns to an initial gear value. The output torque of the transmission 60 (identified by 92) also drops due to less leverage of the $2^{nd}$ gear ratio during the torque phase until the turbine speed 94 starts to drop as the applying element 76 begins to pick up all of the load.

When the torque 86 of the applying element 76 increases beyond a certain value, the applying element 76 begins to take on the load of the transmission 60. Ideally, this is timed so that the upshift is not detected by the driver by way of uncomfortable delays or jerks. When the applying element 76 takes on the transmission load, the speed of the turbine (identified by 94) drops and the output torque 92 of the transmission 60 increases because of the inertia force from all of the moving elements from the $1^{st}$ gear ratio to the $2^{nd}$ gear ratio. This marks the end of the torque phase and the beginning of the inertia phase. The output torque 92 increases until the torque 86 of the applying element 76 is sufficient to maintain a constant predefined turbine acceleration 94. Eventually, the turbine speed 94 reaches the $2^{nd}$ gear ratio, which marks the end of the inertia phase as well as the entire shift event. The input torque of the transmission 60 (identified by 96) remains constant during the upshift in the system illustrated in FIG. 4. However, the input torque 96 may fluctuate during upshifts in other systems.

Based on the dynamic model discussed above and the speed relation between gears, the required torque of an applying element 76 during the torque phase of an upshift is computed. For example, the required torque $T_{24}$ for applying element 76 during a 1-2 upshift is $T_{24}=C_1T_t-C_2T_{LR}-[C_3(I_t+I_{S2})+C_4I_{s1}]\alpha_o$. In the formula $T_t$ is the output torque of the turbine, $T_{LR}$ is the torque of releasing element 78 while holding the transmission 60 in $1^{st}$ gear, $\alpha_o$ is the output shaft acceleration, and $C_1$-$C_4$ are constants.

However, torque is not the actual control actuator in the transmission control system 22 of the present invention. The duty cycle of the solenoid 54 is the control force that changes the torque of a clutch 76. Therefore, the relationship between the flow rate produced by the duty cycle of the solenoid 54 and the torque of the applying element 76 is examined.

First, there is a relationship between accumulator volume $V_a$ and applying element pressure. The calculated applying element pressure is $$P_{24a} = K_a \frac{V_a - V_{amin}}{A_a^2} + P_{MIN},$$

where $K_a$ is the accumulator spring coefficient, $V_{amin}$ is the minimum accumulator volume, $A_a$ is the accumulator piston area, and $P_{MIN}$ is the pre-loaded accumulator pressure.

Based on the applying element pressure, the required torque $T_{24}$ for the applying element 76 is computed. The applying element torque is $T_{24}=P_{24}A_p\mu_fR_{eff}n_{4c}$, where $A_p$ is the friction material area, $\mu_f$ is the coefficient of friction, $R_{eff}$ is the effective radial of the clutch plate, and $n_{4c}$ is the number of friction surfaces. For example, the effective radial of the clutch plate may be based on an inside and/or outside radius of the clutch plate. During an upshift, the control module 28 tracks the total volume of the applying element 76. The total clutch volume is $V_{24}=V_{f24}+V_{a24}$, where $V_{f24}$ is the fill volume of the applying element 76 and $V_{a24}$ is the accumulator instantaneous volume. The fill volume of the applying element 76 is the volume of oil present before the pressure of the oil begins to compress the spring of the accumulator 48. The accumulator instantaneous volume is the volume of oil beyond the fill volume required for the applying element 76 to hold the transmission 60 in $2^{nd}$ gear.

Substituting the relationships from the torque and pressure equations into the equation for total applying element volume produces an equation for the target volume $V_{24}$ of the applying element 76 during a 1-2 upshift. The target volume is:

$$V_{24} = \frac{A_a^2}{K_a}\left\{\frac{1}{P_{4c}A_p\mu_f R_{eff}n_{4c}}\left\{\frac{C_1T_t - C_2T_{LR} -}{[C_3(I_T + I_{S2}) + C_4I_{S1}]\alpha_o}\right\} - P_{MIN}\right\} + V_{amin} + V_{f24}.$$

According to an exemplary embodiment of the present invention, the control module 28 computes a solenoid duty cycle that produces a flow rate of oil capable of filling the applying element 76 to the target volume within a predetermined time period.

Performing upshifts in a fixed time period improves the stability of the transmission 60 and creates more predictable results. However, simply fast-filling the applying element 76 to the target volume after the torque of the releasing element 78 drops produces unstable results. Therefore, in order to guarantee a smooth torque handover between the releasing and applying elements 78 and 76, respectively, the duty cycle of the solenoid 54 is controlled so that the flow rate to the applying element 76 is variable and exponentially decreases until the target volume is reached. In an exemplary embodiment, the flow rate to the applying element 76 is $$Q_{24} = -\frac{V_{24} - V_{f24}}{\tau_2\left(1 - e^{-\frac{\tau_1}{\tau_2}}\right)}e^{-\frac{t}{\tau_2}}.$$

The continuously variable flow rate $Q_{24}$ can be interpreted as including two separate terms. The first term represents a speed-based initial acceleration. Depending on different initial and targeted speeds, the first term is capable of generating different initial accelerations. The second part represents a continuous acceleration change rate, which provides a predetermined time from initial to targeted gear speeds as well as a smooth acceleration rate. Since the desired acceleration is directly associated with clutch control torque, a very small and gradual change in acceleration may be interpreted as quasi-steady-state. In effect, this improves the quality and control ability of the feedback in the control system 22.

The continuously variable flow rate $Q_{24}$ originates from an exponential decay rate $$Q_{24} = A\frac{V_j - V_{f24}}{\tau_1}e^{-\frac{t}{\tau_2}},$$

where $\tau_1$ is the desired duration of the torque phase and $\tau_2$ is the decay rate of the flow rate as the target volume is achieved. As discussed above, the torque phase continues from the time when the applying element 76 is at a minimum torque to the time when the applying element 76 completely takes over the load. For example, the turbine speed changes and reflects the new gear when the applying element 76 takes over the load.

From the start to the finish of the torque phase, the volume of the applying element 76 meets the condition $$V_{24} - V_{f24} = \int_0^{\tau_1} Q_{24} dt$$
$$= \int_0^{\tau_1} A\frac{V_{24} - V_{f24}}{\tau_1}e^{-\frac{t}{\tau_2}} dt$$
$$= A\frac{V_{24} - V_{f24}}{\tau_1}\tau_2\left(1 - e^{-\frac{\tau_1}{\tau_2}}\right).$$

In other words, the difference between the target volume and the fill volume is equal to the integral of the flow rate to the applying element 76 for the duration of the torque phase. From the equation, the constant A is expressed as $$A = \frac{\tau_1}{\tau_2\left(1 - e^{-\frac{\tau_1}{\tau_2}}\right)}.$$

The control module 28 tracks the target volume $V_{24}$ during every normal upshift and compares it to a previously stored target volume value associated with the same position of the throttle blade 40 and/or turbine output torque. For example, turbine output torque and transmission input torque according to the present invention are analogous and may optionally be utilized instead of throttle position for transmission control. Therefore, different target volume values are stored for different positions of the throttle blade 40 during upshifts. When the difference between a current target volume and a previously stored target volume at the same throttle position THR is greater than a predetermined value, the control module 28 updates the target volume value. For example, the control module 28 may add or subtract a percent of the difference between the current and previously stored target volume values.

Additionally, the control module 28 monitors the duration of the torque phase to determine whether the torque phase exceeds a predetermined and fixed amount of time. For example, the fixed amount of time may be 0.5 seconds and may also apply to all shifts. If the time from the beginning of a shift until the beginning of the inertia phase is longer or shorter than the fixed amount of time by a predetermined value, the control module 28 fine tunes a previously stored target volume value. For example, the control module 28 may increase or decrease the stored target volume value by a percent of the difference between a current torque phase duration and the desired torque phase duration.

Figure 5:
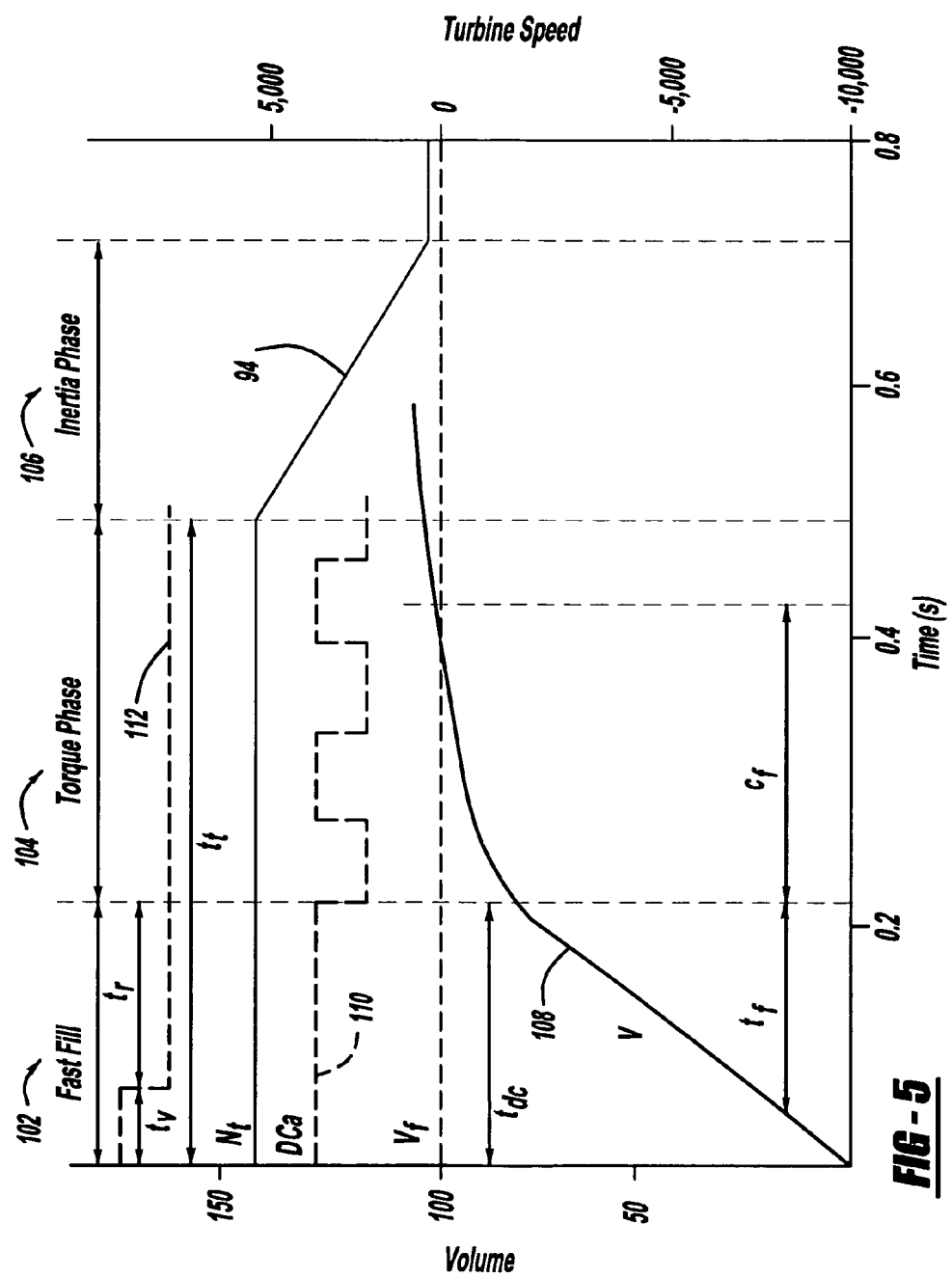
FIG. 5 is a graph illustrating accumulator volume and a duty cycle of a solenoid as a function of time during an upshift operation according to an exemplary embodiment of the present invention.

Referring now to FIG. 5 and using the above models, the transmission control system 22 according to the present invention performs transmission upshift control according to a fast fill phase 102, a target volume based torque phase 104, and an inertia phase 106. As above, the following strategy and equations apply to a 1-2 upshift operation. However, analogous calculations are applied to other upshifts. The torque of the releasing element 78 while holding the transmission 60 in $1^{st}$ gear is $T_{LR}=C_5T_t-[C_6(I_T+I_{S2})+C_7I_{S1}]\alpha_o$. The control module 28 continuously monitors the position of the throttle blade 40 and/or a position of an accelerator pedal as well as the output speed of the transmission 60 to detect when an upshift to $2^{nd}$ gear is appropriate.

Once the control module 28 determines that an upshift is necessary, the fast fill phase 102 begins. During the fast fill phase 102, the duty cycle of the solenoid 54 associated with the applying element 76 is set to a high duty cycle setting and the applying element 76 rapidly begins to fill with oil (identified by a steep increase in volume 108). For example, the high duty cycle setting (identified by 110) may be 100%. Additionally, a clock begins to increment at the beginning of the fast fill phase 102 to track the duration $t_t$ of the upshift. Initially, a duty cycle (identified by 112) of a solenoid associated with the releasing element 78 is also set to a high duty cycle setting. The releasing element 78 is released when the value of the clock t is greater than a predetermined time $t_v$. In an exemplary embodiment, the predetermined time $t_v$ is equal $t_{dc}-t_r$, where $t_r=K_s(t_s-t_{sr})-C_8$. Although the time at which the releasing element 78 is released is fixed, the fixed time may vary based on line pressure and/or fluid temperature in the transmission 60 and may also vary for other clutches 70, 72, 74, and 76 in the transmission 60.

The predetermined time to release the releasing element 78 may also be based on line pressure and/or fluid temperature in the transmission 60. In the function, $t_{dc}$ is the predetermined duration of the fast fill phase 102, $K_s$ is the learned time-to-slip adjustment for the releasing element 78, $t_s$ is a look-up table value for the nominal observed release time from the initial venting of the releasing element 78, and $t_{sr}$ is the time-to-slip reduction for a change-minds shift.

The fast fill phase 102 ends and the target volume based torque phase 104 begins when the term $t_f$ (or the time remaining to nearly fill the applying element 76) is less than or equal to zero. In an exemplary embodiment, $$t_f = \frac{V_f - V}{MQ_f} - C_f K_f,$$

where $C_f$ is the time from the beginning of the target volume based torque phase 104 to when the fill volume $V_f$ of the applying element 76 is reached and $K_f$ is a duty cycle compensation factor for a reduced fill rate.

Once the target volume based torque phase 104 begins, the control module 28 adjusts the duty cycle 110 of the solenoid 54 so that the duty cycle 110 begins to exponentially decrease. The duty cycle $DC_a$ is based on the exponentially decreasing flow rate according to $$DC_a = 100 \frac{Q_{24} - Q_r}{MQ_a - Q_r},$$

where $$Q_{24} = -\frac{V_{24} + \Delta V - V_{f24}}{\tau_2 \left(1 - e^{-\frac{\tau_1}{\tau_2}}\right)} e^{-\frac{t}{\tau_2}},$$

$Q_r$ is the releasing element 78 flow rate, $Q_a$ is the applying element 76 flow rate, and M is a line pressure factor. For example, the applying and releasing element flow rates $Q_a$ and $Q_r$, respectively, may be look-up table values based on a current volume of the oil. The term $\Delta V$ is added to ensure that the flow rate of oil to the applying element 76 is always greater than zero, even after the target volume $V_{24}$ is achieved.

In an exemplary embodiment and as discussed above, the initial target volume $V_{24}$ is determined according to $$V_{24} = \frac{A_a^2}{K_a} \left\{ \frac{1}{P_{4c} A_p \mu_f R_{\textit{eff}} n_{4c}} \left\{ \frac{C_1 T_t - C_2 T_{LR} -}{[C_3(I_T + I_{S2}) + C_4 I_{S1}]\alpha_o} \right\} - P_{\text{MIN}} \right\} + V_{amin} + V_{f24}.$$

The target volume based torque phase 104 ends and the inertia phase 106 begins when the torque of the applying element 76 causes a change in turbine speed $N_t$. The control module 28 detects a change in turbine speed according to $N_t < N_i - B$, where $N_i$ is the turbine speed during the target volume based torque phase 104. In other words, the control module 28 detects when the turbine speed decreases by a predetermined speed B.

Alternatively or additionally, the control module 28 detects a change in turbine speed according to $\alpha_{tf} < k_{\alpha d} \alpha_{ij}$, where $\alpha_{tf}$ is the filtered turbine acceleration, $k_{\alpha d}$ is a predetermined factor, and $\alpha_{ij}$ is the desired upshift acceleration. In other words, the control module 28 detects when the turbine acceleration comes within a predetermined range of the desired turbine acceleration.

At that time, the total volume $V_{24}$ is learned with respect to the current position of the throttle blade 40 and/or the turbine output torque. In an exemplary embodiment, the total volume is also learned with respect to the current input torque of the transmission 60. The control module 28 also compares the upshift time $t_t$ to the desired shift duration when the inertia phase 106 begins, and any discrepancy may be used to update the estimated fill volume $V_{f24}$ of the applying element 76.

During the inertia phase 106, the targeted volume control for desired acceleration is expressed according to $$\frac{\Delta T_{24}}{\Delta t} = C_1 \frac{\Delta T_t}{\Delta t} - [C_2(I_T + I_{S2}) + C_3 I_{C1} + C_4 I_{S1}] \frac{\alpha_{dt} - \alpha_t}{\Delta t}.$$

However, since the solenoid duty cycle is the actual control force that changes the torque of a clutch, the relationship between torque and flow rate is examined. The relationship between accumulator pressure and flow rate is expressed according to $$Q_{DC} = \frac{\Delta V_a}{\Delta t} = \frac{A_a^2}{K_a} \frac{\Delta P_{24}}{\Delta t}.$$

Then, the torque on clutch is determined according to $T_{24} = P_{24} A_p \mu_f R_{\textit{eff}} n_{24}$. All of the torque, pressure, and acceleration relationships are substituted to determine the target volume control duty cycle flow rate according to $$Q_{DC} = \frac{A_a^2}{\mu_f K_a R_{\textit{eff}} N_{24} A_p} \left\{ C_1 \frac{\Delta T_t}{\Delta t} - [C_2(I_T + I_{S2}) + C_3 I_{C1} + C_4 I_{S1}] \frac{\alpha_{\Delta t} - \alpha_t}{\Delta t} \right\}.$$

Desired acceleration is a look-up table value based on the output speed of the transmission 60, the anticipated position of the throttle blade 40 and the targeted shift gear.

Figure 6:
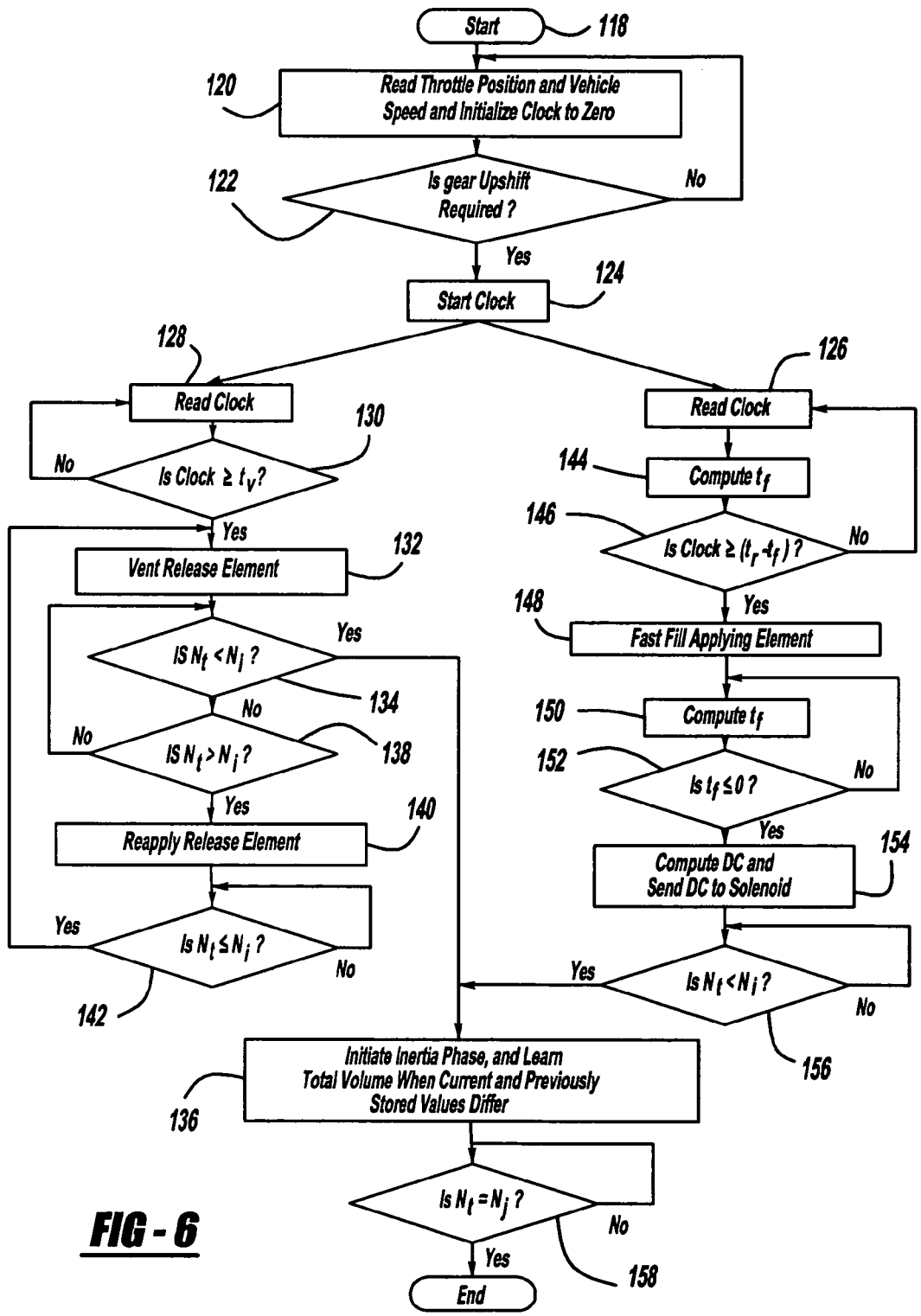
FIG. 6 is a flowchart illustrating steps performed by the control module of FIG. 2 to execute an upshift operation and utilize target volume torque phase control according to an exemplary embodiment of the present invention.

Referring now to FIG. 6, a target volume algorithm begins in step 118. In step 120, the control module 28 reads the current position THR of the throttle blade 40 and the output speed $N_o$ of the transmission 60 and initializes a clock to zero. In step 122, control determines whether an upshift operation is required. If false, control returns to step 120. If true, the control module 28 starts the clock in step 124. Step 124 proceeds to both steps 126 and 128, and steps 126 and 128 are executed simultaneously and in a parallel format. In step 128, the control module 28 reads the current value of the clock. In step 130, control determines whether the value of the clock is greater than or equal to the predetermined venting time $t_v$. If false, control returns to step 128.

If true, the control module 28 vents the releasing element 78 in step 132. In step 134, control determines whether the current turbine speed is lower than the initial turbine speed. If true, control proceeds to step 136. If false, control determines whether the current turbine speed is greater than the initial turbine speed in step 138. If false, control returns to step 134. If true, the control module 28 reapplies the release element 78 in step 140. In step 142, control determines whether the current turbine speed is less than or equal to the initial turbine speed. If false, control loops to step 142. If true, control returns to step 132.

In step 126, the control module 28 reads the current value of the clock. In step 144, the control module 28 computes the current time left to nearly fill the applying element 76 $t_f$. In step 146, control determines whether the current value of the clock is greater than or equal to $(t_r-t_f)$. If false, control returns to step 126. If true, the control module beings to fast fill the applying element 76 in step 148. In step 150, the control module 28 computes the current time left to nearly fill the applying element 76 $t_f$. In step 152, control determines whether $t_f$ is less than or equal to zero. If false, control returns to step 150. If true, the control module 28 adjusts the solenoid 54 duty cycle so that the duty cycle exponentially decays in step 154. In step 156, control determines whether the turbine speed is less than the initial gear speed.

If false, control loops to step 156. If true, the control module 28 initiates the inertia phase 106 in step 136. The control module 28 also optionally adjusts a previously stored total volume associated with the current input torque of the transmission 60 or the current position of the throttle blade 40 THR when the difference between the current and previous values is greater than a predetermined value. In step 158, control determines whether the current turbine speed is equal to the target turbine speed. If false, control loops to step 158. If true, control ends.

Figure 7:
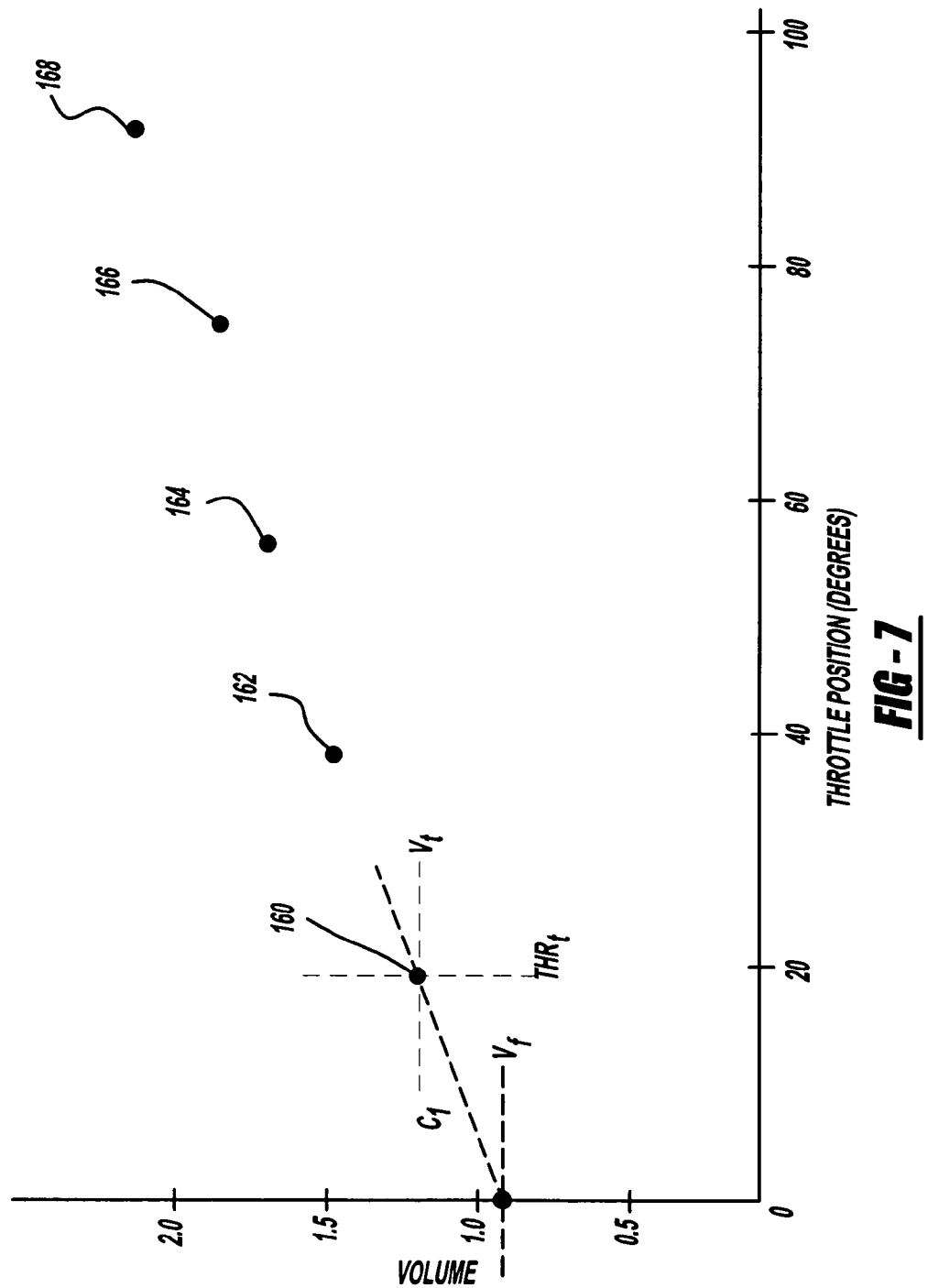
FIG. 7 is a graph illustrating the relationship between throttle position and volume in a clutch hydraulic system according to an exemplary embodiment of the present invention.

The above-described means for detecting the target volume within the fluid system can be used in part to detect a fill volume $V_f$ of an accumulator 10. For instance, FIG. 7 is a graph showing the throttle position on the X-axis and the volume of fluid within the clutch on the Y-axis. In the embodiment shown, data points 160, 162, 164, 166, 168 each represent different target volumes of an accumulator detected at different throttle positions. The control module 28 detects these target volume data points 160, 162, 164, 166, 168 in the manner described above. The control module 28 extrapolates a current fill volume, $V_f$, from at least one of the detected target volume data points 160, 162, 164, 166, 168.

More specifically, in the embodiment represented in FIG. 7, the control module 28 extrapolates the current fill volume $V_f$ with a linear function relating the fill volume, $V_f$, the detected target volume, $V_t$, a predetermined slope, $C_1$, and the throttle position, $THR_t$. The linear function for the embodiment shown in FIG. 7 is expressed as:

$$V_t=C_1(THR_t)+V_f$$

Solving for the current fill volume, the equation becomes:

$$V_f=V_t-C_1(THR_t)$$

The slope, $C_1$, is predetermined based on the spring rate of the spring 12 within the accumulator 10 and/or other factors. Thus, once the target volume, $V_t$, for a known throttle position, $THR_T$, the control module 28 is able to calculate the current fill volume $V_f$. It will be appreciated, however, that the control module 28 could extrapolate the current fill volume from the target volume in any suitable manner without departing from the scope of the present disclosure.

In one embodiment, when the difference between the current fill volume, $V_f$, and a previously stored fill volume is greater than a predetermined value, the control module 28 updates the fill volume. For example, the control module 28 adds or subtracts a percentage of the difference between the current and previously stored fill volume values. Accordingly, the control module 28 can more accurately control the transmission because the fill volume used by its control logic is more likely to be accurate and up to date.

Furthermore, in one embodiment, the control module 28 only extrapolates the current fill volume during a shift at which the throttle position is less than a predetermined value. Accordingly, the current fill volume can be detected more accurately at these lower throttle positions.

It will be appreciated that the control module 28 could extrapolate the current fill volume based on the transmission input torque, rather than the throttle position in the same manner described above. More specifically, the control module 28 can extrapolate the current fill volume $V_f$ with a linear function relating the fill volume, $V_f$, the detected target volume, $V_t$, a predetermined slope, $C$, and the transmission input torque, $IT_t$. This function is expressed as:

$$V_f=V_t-C(IT_t)$$

Thus, once the target volume, $V_t$, for a known transmission input torque, $IT_t$, the control module 28 is able to calculate the current fill volume $V_f$. In one embodiment, the control module 28 only extrapolates the current fill volume, $V_f$, during a shift at which the transmission input torque, $IT_t$, is less than a predetermined value for more accurate detection of the current fill volume, $V_f$.

In one embodiment, fill volumes are detected in this manner for less than all of the gears within a transmission. For the other gear(s), the fill volume is detected only during a downshift. For instance, in the embodiment of FIG. 3, clutch 78 acts as the applying clutch during a downshift from a higher gear to a lower gear (e.g., from second gear to first gear). Thus, for clutch 78, the control module 28 detects a fill volume for the clutch 78 during downshift only.

Figure 8:
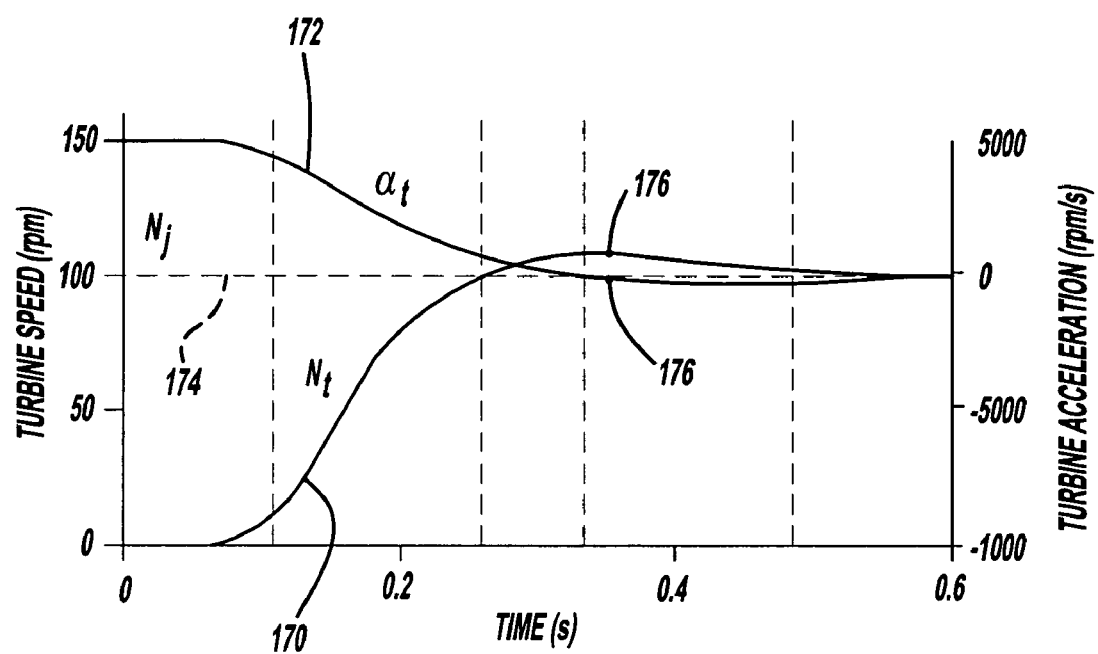
FIG. 8 is a graph illustrating a downshift of a transmission according to an exemplary embodiment of the present invention.

More specifically, a downshift is represented graphically in FIG. 8. Line 170 represents the turbine speed, $N_t$, and line 172 represents the acceleration of the turbine, $\alpha_t$. Also, dashed line 174, $N_j$, represents the turbine speed for achieving the gear ratio of the lower gear. As shown by line 170, before the downshift occurs, the turbine speed, $N_t$, increases and eventually exceeds the turbine speed, $N_j$. Then, at point 176 (represented on both lines 170 and 172), the turbine speed, $N_t$, begins to exhibit a negative rate of change (i.e., the turbine decelerates). At point 176, clutch 78 begins to produce torque for achieving the downshift. Thus, at point 176, the control module 28 detects the volume in the accumulator 10, and this detected volume represents a close approximation of the fill volume for clutch 78. In one embodiment, the control module 28 includes a predetermined offset for adjusting the detected volume to account for any difference between the detected volume and the actual fill volume for the clutch 78. If the difference between this adjusted fill volume and the previously stored fill volume exceeds a predetermined amount, the previously stored value can be updated as described above. Accordingly, the fill volume of clutch 78 can also remain more accurate.

Figure 9:
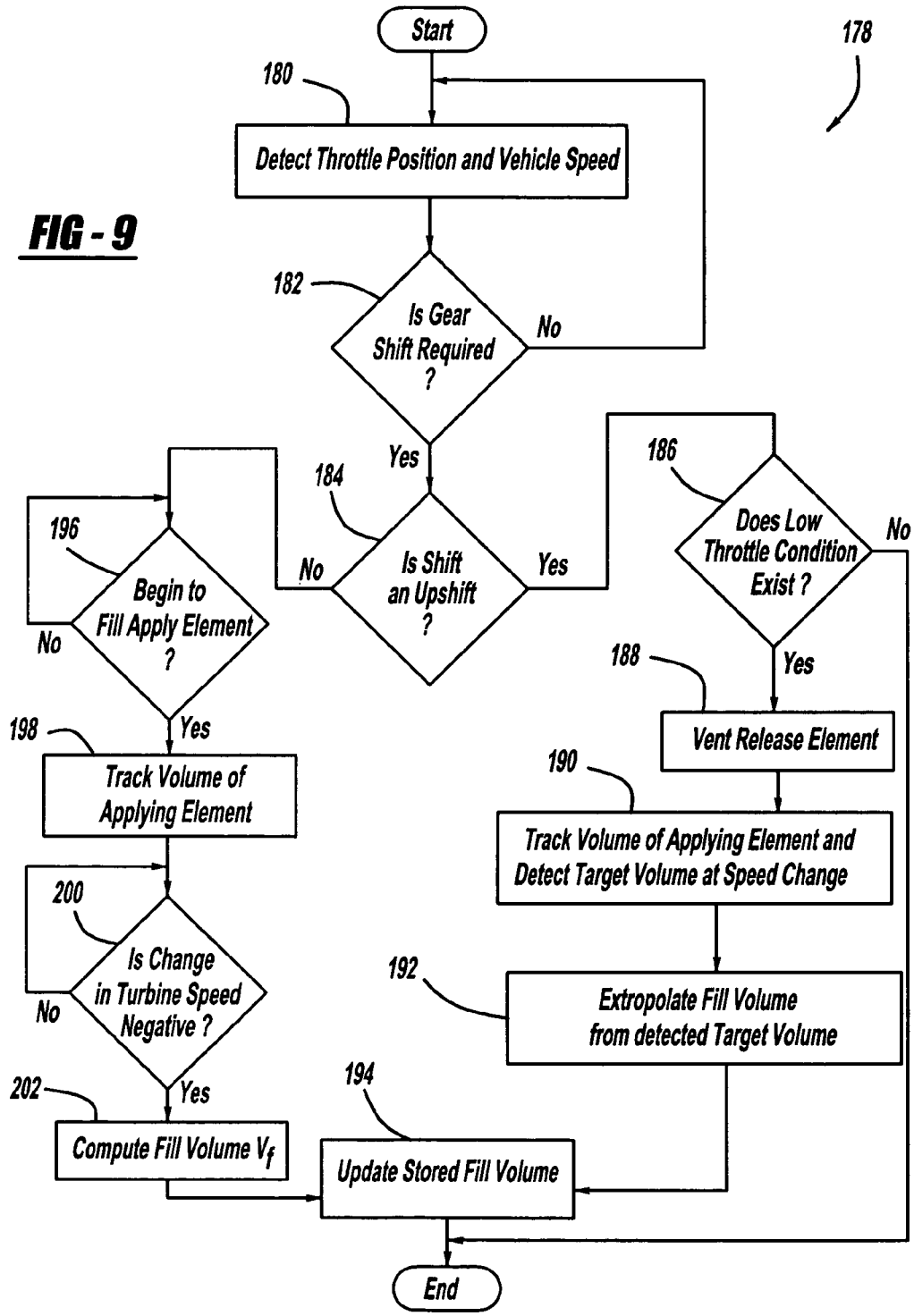
FIG. 9 is a flowchart illustrating a method of fill volume learning for a transmission control system according to an exemplary embodiment of the present invention.

Referring now to FIG. 9, a method 178 of detecting the current fill volumes described above is illustrated. In one embodiment, the method 178 is used for transmissions that include PWM solenoids and/or transmissions that use solenoids to directly control the respective clutches.

The method 178 begins in step 180, in which the throttle position and the vehicle speed are detected. The method 178 continues in decision block 182, in which it is determined whether a gear shift is required. If a gear shift is not required, the method 178 returns to step 180. If a gear shift is required, the method 178 continues to decision block 184.

In decision block 184, it is determined whether an upshift is necessary. If an upshift is necessary, the method 78 continues to decision block 186, in which it is determined whether a low throttle condition exists. As mentioned above, the control module 28 can detect fill volumes more accurately at low throttle positions. Thus, as shown in FIG. 9, if a low throttle condition does not exist, the method 178 ends. However, if a low throttle condition does exist, the method 178 moves to step 188.

In step 188, the control module 28 begins to vent the oil from the release element. Subsequently, in step 190, the control module 28 tracks the volume of fluid within the applying element, and the target volume, $V_t$, is detected as described above.

Next, in step 192, the control module 28 extrapolates the current fill volume $V_f$ from the detected target volume, $V_t$ as described above. Finally, in step 194, the control module 28 updates the stored fill volume. As mentioned, in one embodiment, the stored fill volume is updated only when the difference between the stored fill volume and the current fill volume exceeds a predetermined value.

Referring back to decision block 184, if a downshift occurs, the method 178 moves to decision block 196. In decision block 196, it is determined whether it is time to begin filling the applying clutch (e.g., clutch 78 from FIG. 3). In one embodiment, the decision block 196 occurs according to the disclosure of U.S. Pat. No. 6,978,201, which issued on Dec. 20, 2005, and which is incorporated herein by reference. If it is not time to fill the applying clutch, decision block 196 loops back on itself. When it is time to begin filling the applying clutch, the method 178 continues to step 198, in which the control module 28 tracks the volume of the applying clutch. Then, in decision block 200, it is determined whether the turbine shows a negative acceleration. If not, then decision block 200 loops back on itself. If a negative acceleration is detected, then the method 178 moves to step 202 and detects the volume in the applying clutch (i.e., a close approximation of the fill volume, $V_f$, of the applying clutch). As stated above, the control module 28 can include a predetermined offset to adjust the detected volume for a more accurate fill volume of the applying clutch. Then, the method 178 moves to step 194, in which the stored fill volume is updated.

In sum, the present disclosure reveals a means for maintaining accurate fill volumes for the clutches in a transmission. This allows the transmission to maintain smooth gear shifting over the life of the vehicle.

The above discussion is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A transmission control system for a transmission including a first gear engagement element that receives a fluid and engages a first gear in response to pressure from the fluid, the system comprising:

an electromagnetic actuator that receives a control signal and that selectively interrupts flow of the fluid to the first gear engagement element based on a value of the control signal; and a control module that generates the control signal and that adjusts the value of the control signal so that the first gear engagement element produces a first torque sufficient to hold the first gear, wherein the control module detects a target volume of the fluid when the first gear engagement element produces the first torque, and wherein the control module extrapolates a current fill volume of the first gear engagement element from the target volume, the current fill volume being a volume at which the first gear engagement element begins to produce torque during a shift.

2. The transmission control system of claim 1, wherein the control module adjusts a value of a previously stored fill volume for subsequent transmission control when a difference between the current fill volume and the previously stored fill volume is greater than a predetermined value.

3. The transmission control system of claim 1, wherein the control module only extrapolates the current fill volume during a shift at which at least one of a position of a throttle blade is less than a predetermined value and a transmission input torque is less than a predetermined value.

4. The transmission control system of claim 1, wherein the transmission includes a second gear engagement element that includes a first volume of fluid before a shift is initiated, and wherein, after initiating the shift, the control module begins to evacuate the first volume of fluid from the second gear engagement element before computing the target volume.

5. The transmission control system of claim 1, wherein the control module extrapolates the current fill volume with at least one linear function relating the fill volume, the target volume, a predetermined slope, and at least one of a throttle position and a transmission input torque, the at least one linear function chosen from a group consisting of:

Fill Volume=Target Volume−Slope(Throttle Position); and

Fill Volume=Target Volume−Slope(Transmission Input torque).

6. The transmission control system of claim 1, wherein the transmission includes a second gear engagement element that receives the fluid and engages a second gear, and wherein the control module detects a fill volume of the second gear engagement element by detecting a current volume of the fluid received by the second gear engagement element when the second gear engagement element begins to produce torque during a shift.

7. The transmission control system of claim 6, wherein the second gear engagement element begins to produce torque when a turbine speed begins to exhibit a negative rate of change during the shift.

8. The transmission control system of claim 6, wherein the transmission is an automatic transmission of a vehicle, wherein the first gear engagement element is an applying clutch that is applied during an upshift from a lower gear to a higher gear, and wherein the second gear engagement element is an applying clutch that is applied during a downshift from a higher gear to a lower gear.

9. The transmission control system of claim 1, wherein the transmission includes a second gear engagement element that receives fluid and engages a second gear during a downshift and wherein the control module detects a fill volume of the second gear engagement element only during the downshift.

10. A transmission control system for a transmission including first and second gear engagement elements that receive fluid and engage first and second gears, respectively, in response to pressure from the fluid, the transmission control system comprising:

an electromagnetic actuator that receives a control signal and that selectively interrupts flow of the fluid to the first gear engagement element based on a value of the control signal; and a control module that generates the control signal and that adjusts the value of the control signal so that the first gear engagement element produces a first torque sufficient to hold the first gear during an upshift;

wherein the control module detects a target volume of the fluid when the first gear engagement element produces the first torque, and wherein the control module extrapolates a current fill volume of the first gear engagement element from the target volume, the current fill volume being a volume at which the first gear engagement element begins to produce torque during a shift;

wherein the control module detects a current fill volume of the second gear engagement element by detecting a current volume of the fluid received by the second gear engagement element when the second gear engagement element begins to produce torque during a downshift; and wherein the control module only extrapolates the current fill volume of the first gear engagement when at least one of a position of a throttle blade is less than a predetermined value and a transmission input torque is less than a predetermined value.

11. The transmission control system of claim 10, wherein the control module adjusts a value of a previously stored fill volume for at least one of the first and second gear engagement elements for subsequent transmission control when a difference between the current fill volume and the previously stored fill volume for the at least one of the first and second gear engagement elements is greater than a predetermined value.

12. A method for operating a transmission control system for a transmission including a first gear engagement element that receives fluid and engages a first gear in response to pressure from the fluid, the method comprising the steps of:

selectively interrupting flow of the fluid to the first gear engagement element based on a value of a control signal;

adjusting the value of the control signal so that the first gear engagement element produces a first torque sufficient to hold the first gear;

detecting a target volume of the fluid when the first gear engagement element produces the first torque; and extrapolating a current fill volume of the first gear engagement element from the target volume, the current fill volume being a volume at which the first gear engagement element begins to produce torque during a shift.

13. The method of claim 12, further comprising the step of adjusting a value of a previously stored fill volume for subsequent transmission control when a difference between the current fill volume and the previously stored fill volume is greater than a predetermined value.

14. The method of claim 12, further comprising only extrapolating the current fill volume during a shift when at least one of a position of a throttle blade is less than a predetermined value and a transmission input torque is less than a predetermined speed.

15. The method of claim 12, further comprising the steps of:

providing a second gear engagement element that includes a first volume of fluid before a shift is initiated;

initiating the shift; and beginning to evacuate the first volume of fluid from the second gear engagement element before detecting the target volume.

16. The method of claim 12, wherein the step of extrapolating a current fill volume comprises extrapolating the current fill volume with at least one linear function relating the fill volume, the target volume, a predetermined slope, and at least one of a throttle position and a transmission input torque, the at least one linear function chosen from a group consisting of:

Fill Volume=Target Volume−Slope(Throttle Position); and

Fill Volume=Target Volume−Slope(Transmission Input Torque).

17. The method of claim 12, further comprising the steps of:

providing a second gear engagement element that receives the fluid and engages a second gear; and computing a fill volume of the second gear engagement element by computing a current volume of the fluid received by the second gear engagement element when the second gear engagement element begins to produce torque during a shift.

18. The method of claim 17, wherein the second gear engagement element begins to produce torque when a turbine speed begins to exhibit a negative rate of change during the shift.

19. The method of claim 17, wherein the transmission is an automatic transmission of a vehicle, the first gear engagement element is an applying clutch that is applied during an upshift from a lower gear to a higher gear, and the second gear engagement element is an applying clutch that is applied during a downshift from a higher gear to a lower gear.

20. The method of claim 12, further comprising the steps of:

providing a second gear engagement element that receives fluid and engages a second gear during both an upshift and a downshift; and detecting a fill volume of the second gear engagement element only during the downshift.

* * * * *